United States Patent
Liu et al.

(10) Patent No.: US 7,414,776 B2
(45) Date of Patent: Aug. 19, 2008

(54) ELECTROPHORETIC DISPLAY INCLUDING DISPLAY MEDIUM CONTAINING GELLING AGENT FOR IMAGE STABILITY

(75) Inventors: Ping Liu, Mississauga (CA); Nan-Xing Hu, Oakville (CA); Naveen Chopra, Oakville (CA); Man-Chung Tam, Mississauga (CA); Peter M. Kazmaier, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 302 days.

(21) Appl. No.: 11/169,924

(22) Filed: Jun. 30, 2005

(65) Prior Publication Data

US 2007/0002428 A1    Jan. 4, 2007

(51) Int. Cl.
*G02B 26/00* (2006.01)
*G09G 3/34* (2006.01)
*G03G 17/04* (2006.01)

(52) U.S. Cl. .................. 359/296; 345/107; 430/32

(58) Field of Classification Search .............. 359/296; 345/107; 427/213.3; 430/32; 252/583, 586; 204/471, 483; 264/4, 1.7, 4.1; 428/402.2, 428/403

See application file for complete search history.

(56) References Cited

U.S. PATENT DOCUMENTS

| | | | |
|---|---|---|---|
| 3,668,106 A | 6/1972 | Ota | |
| 3,960,514 A | 6/1976 | Teng et al. | |
| 4,272,596 A | 6/1981 | Harbour et al. | |
| 4,981,608 A | 1/1991 | Gunther | |
| 5,132,355 A | 7/1992 | Nahlovsky et al. | |
| 5,417,287 A | 5/1995 | Smith et al. | |
| 5,514,645 A | 5/1996 | McCabe et al. | |
| 6,017,584 A | 1/2000 | Albert et al. | |
| 6,113,810 A | 9/2000 | Hou et al. | |
| 6,529,313 B1 | 3/2003 | Lin et al. | |
| 6,574,034 B1 | 6/2003 | Lin et al. | |
| 6,788,449 B2 | 9/2004 | Liang et al. | |
| 6,795,228 B2 | 9/2004 | Sacripante et al. | |
| 6,872,243 B2 | 3/2005 | Breton et al. | |
| 7,130,107 B2 * | 10/2006 | Liu et al. | 359/296 |
| 2003/0037702 A1 | 2/2003 | Jacobson | |
| 2003/0132925 A1 | 7/2003 | Lin et al. | |
| 2004/0065227 A1 | 4/2004 | Breton et al. | |
| 2004/0145362 A1* | 7/2004 | Lin et al. | 323/316 |
| 2004/0145562 A1 | 7/2004 | Horikiri | |
| 2004/0252360 A1 | 12/2004 | Webber et al. | |

FOREIGN PATENT DOCUMENTS

| | | | |
|---|---|---|---|
| EP | 0 207 787 A2 | | 1/1987 |
| EP | 0 338 738 A1 | | 10/1989 |
| JP | 2004-149691 | * | 5/2003 |
| WO | WO 02/075443 | | 9/2002 |

* cited by examiner

*Primary Examiner*—Ricky Mack
*Assistant Examiner*—Brandi N Thomas
(74) *Attorney, Agent, or Firm*—Oliff & Berridge, PLC

(57) ABSTRACT

A display medium for an electrophoretic display device includes a liquid system, at least one thermally reversible gelling agent, and at least one set of particles exhibiting a color. Inclusion of the gelling agent enables an image formed in the display device at an elevated temperature of about or above the melting point of the gelling agent to be fixed in a gel state, e.g., at temperature of about or below a gel point of the gelling agent. The image thus has stability, even in the absence of an applied electrophoretic field.

13 Claims, 3 Drawing Sheets

ELECTROPHORETIC DISPLAY INCLUDING DISPLAY MEDIUM CONTAINING GELLING AGENT FOR IMAGE STABILITY

BACKGROUND

Described herein are display mediums particularly suited for use in electrophoretic displays, for example in filling reservoirs or microcapsules of the electrophoretic display device. Also described are methods of displaying images with the electrophoretic display devices. Inclusion of a thermally reversible gelling agent in the display medium allows the image to retain stability even after an applied electrical field used in forming the image is removed.

Electrophoretic display devices, also referred to as electronic paper, are well known in the art. An electrophoretic display generally comprises a suspension of a single type of charged pigment particles colloidally dispersed in a colored liquid of matching specific gravity contained in a cell comprising two parallel and transparent conducting electrode panels. The charged particles are transported between the electrode panels under the influence of an electric field, and can therefore be made to display an image through appropriate application of the electric field on the electrodes. The advantages of electrophoretic displays as a means for providing information and displaying images has been well appreciated in the prior art.

U.S. Pat. No. 4,272,596, incorporated herein by reference in its entirety, illustrates a typical electrophoretic display structure. The electrophoretic display device comprises a pair of electrodes associated so as to form a cavity therebetween, which cavity is filled with an electrophoretic suspension layer comprising a colored suspending medium containing colloidal sized particles in an electrically insulating liquid and finely divided electrophoretic particles suspended in the suspending medium. A source of electrical potential is coupled to the electrodes. With an electric field applied, the particles form an image as they follow the field. See especially FIG. 1 therein.

U.S. Pat. No. 6,113,810, incorporated herein by reference, describes a dielectric dispersion for use in an electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second pluralities. In one embodiment, the first and second plurality of particles are each formed by separate two stage dispersion polymerization reactions. Each set of particles is formed with unique secondary and functional monomers. Corresponding charge control agents are added to the dispersion to establish opposite polarities on the respective particles.

U.S. Pat. No. 6,017,584 discloses encapsulated displays, i.e., displays in which the electrophoretic fluid is encapsulated within a microcapsule. This fluid may be a mixture of two or more fluids or may be a single fluid. The displays may further comprise particles dispersed in a suspending fluid, wherein the particles contain a liquid. In either case, the suspending fluid may have a density or refractive index substantially matched to that of the particles dispersed therein. Application of electric fields to any of the electrophoretic displays described therein is indicated to affect an optical property of the display.

In one embodiment, the 584 Patent describes an encapsulated electro-osmotic display wherein a porous or gel-like internal phase of a capsule is swelled (i.e., filled) and drained by the electro-osmotically induced motion of a refractive index matching fluid (i.e., the difference between the refractive index of the fluid and the refractive index of the internal phase is preferably within 0.5). When the pores of the material are filled with the fluid, the capsule acts as a homogeneous optical material, thus largely transmitting or refracting light according to the bulk properties of the medium. When the pores are vacated by the mobile fluid, however, a larger quantity of optical index mismatches are present and light scattering is greatly increased. See column 10, lines 19-32 of the 584 Patent. This embodiment does not describe inclusion of a thermally reversible gelling agent as part of the suspending fluid.

U.S. Pat. No. 6,574,034, incorporated herein by reference, describes a method for displaying an image with an electrophoretic display device that includes a multiplicity of individual reservoirs or microcapsules, each containing an electrophoretic display fluid, located between two conductive film substrates, at least one of which is transparent. The method includes appropriately applying an electric field and a magnetic force to a selected individual reservoir in a manner to cause either a first set of particles or a second set of particles of the display fluid to be displayed The first set of particles exhibit a color different from and contrasting to a color of the second set of particles, and also preferably a different charging property.

One of the major problems still facing reimageable electronic paper is poor image stability, particularly after the electric field applied in forming the image in the display device is removed. Without a sustained electrostatic force, the electronic image degrades during handling (e.g., viewing/reading by a user). It is desired to develop an electrophoretic display having improved image stability.

SUMMARY

In embodiments, described are display mediums for an electrophoretic display device, the display medium comprising a liquid system, at least one thermally reversible gelling agent, and at least one set of particles exhibiting a color. Inclusion of the gelling agent enables an image formed in the display device at an elevated temperature of about or above the melting point of the gelling agent to be fixed in a gel state upon cooling of the display device, e.g., to a temperature of about or below a gel point of the gelling agent. The image thus has stability, even in the absence of an applied field.

In embodiments, at least one gelling agent has a melting point of from about 45° C. to about 70° C. and a gel point of from about 20° C. to about 40° C.

In embodiments, also described are electrophoretic display devices comprising an electrophoretic display layer located between two conductive film substrates, at least one of which is transparent, wherein the electrophoretic display layer includes therein a multiplicity of individual units that contain a display medium, wherein the display medium comprises a liquid system, at least one thermally reversible gelling agent, and at least one set of particles exhibiting a color.

In embodiments, the individual units are containers defined by spacers in between the containers or are microcapsules that encapsulate the display medium therein.

In further embodiments, also described is a method of forming an image in an electrophoretic display device comprising an electrophoretic display layer located between two conductive film substrates, at least one of which is transparent, wherein the electrophoretic display layer includes therein a multiplicity of individual units that contain a display medium, wherein the display medium comprises a liquid system, ate least one thermally reversible gelling agent, and at least one set of particles exhibiting a color, the method comprising heating the display device to a temperature of about or above a melting point of the at least one thermally reversible gelling agent, subsequently forming an image in the display device by selective application of an appropriate field to selected ones of the multiplicity of individual units, and subsequently cooling the display device to a temperature of about or below a gel point of the at least one thermally reversible gelling agent to fix the image in a gel state.

BRIEF DESCRIPTION OF THE DRAWINGS

FIG. 1 illustrates a side view of an electrophoretic display device of one embodiment in an off position, while

FIG. 4 illustrates a side view of an electrophoretic display device in accordance with another embodiment in an off position in which the display mediums include magnetic force attracting magnetic particles, while

DETAILED DESCRIPTION OF EMBODIMENTS

Structures of electrophoretic display devices in which the display medium may be included will first be detailed. Use of the electrophoretic display mediums described herein is not, however, necessarily limited to these most preferred embodiments, and any other suitable design for an electrophoretic display device may be used without limitation. Mention of an electrophoretic display device design other than those described herein may include, for example, U.S. Pat. No. 6,788,449, incorporated herein by reference in its entirety.

Figure 1:
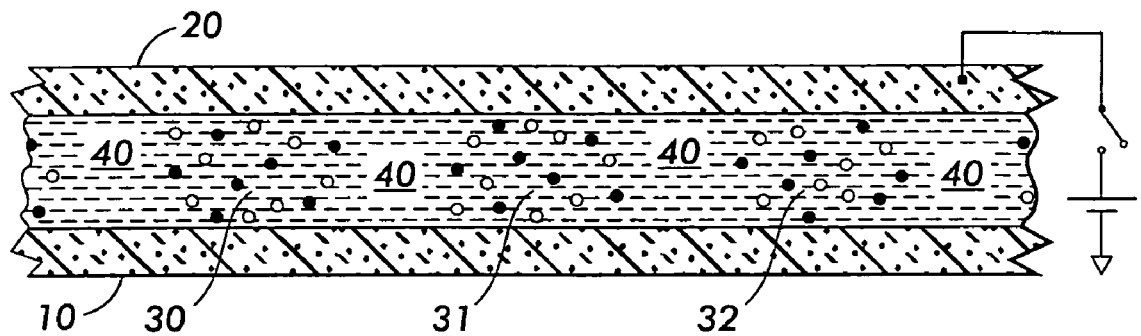

As illustrated in FIG. 1, a first embodiment of an electrophoretic display device comprises two conductive film substrates 10 and 20 disposed oppositely of each other, with an electrophoretic layer 40 therebetween. In this embodiment, electrophoretic layer 40 is comprised of a spacer layer that defines a multiplicity of individual reservoirs that contain the display medium.

As the conductive film substrates of the electrophoretic display device, any suitable materials may be used without limitation, for example including materials presently known and used in the art. At least one of the conductive film substrates, in particular at least the top conductive film substrate through which the images formed by the device must be viewed, should be transparent in order to enable such viewing. Both substrates may be transparent, if desired. Of course, the bottom or back substrate need not be transparent, and may instead be, for example, a light reflecting or light absorbing material. As suitable materials that may be used, mention may be made of conductive plastic films, for example plastic films coated with indium tin oxide (ITO) such as polyethylene terephthalate (PET) films, conductive glass films, such as ITO coated glass, and conductive thin metals. For transparency, ITO coated plastic and glass films are preferred.

Preferably, the substrates that sandwich the spacer layer therebetween have a length and width corresponding to the overall length and width of the electrophoretic display device. The substrates are thus preferably continuous, unitary films that are not separated over just individual reservoirs of the display device. The substrates are preferably made to be as thin as possible while still maintaining appropriate conductive properties and structural integrity. For example, the substrates should have a height (i.e., thickness) of from about 20 microns to about 100 microns.

Between the conductive film substrates are contained a multiplicity of individual reservoirs (30, 31, 32), each filled with a display medium described more fully below. Each of the individual reservoirs defines one container and/or cell of the electrophoretic display mediums within the display device.

The spacer 40 keeps the individual reservoirs separate from one another. Any suitable spacer design may be used. For example, the spacer may be of the type described in U.S. Patent Publication No. 2003-0132925 A1, incorporated herein by reference in its entirety. As described therein, the width and/or diameter of the individual reservoirs are preferably from, for example, about 5 microns to about 400 microns. Also as described therein, the spacer may be comprised of more than one layer/sheet, for example when pocket sheets having differently colored display mediums therein are stacked together. Obviously, the display medium to be used within the reservoirs must contain particles of a size smaller than the reservoir width/diameter in order to function. The solid portion of the spacer separating the multiplicity of reservoirs, i.e., the partitions between individual reservoirs of the spacer layer, should preferably be as thin as possible. Preferred partition thicknesses are on the order of, for example, about 10 microns to about 100 microns, more preferably about 15 to about 50 microns.

The display device may have any suitable overall length and width as desired. The electrophoretic display device may also be made to have any desired height, although a total height of from about 30 to about 400 microns is preferred in terms of size and ease of use of the device.

In forming the electrophoretic display device, the reservoirs, or pockets, of the spacer are filled with the display medium and the spacer layer is attached to a first, or bottom, conductive film substrate. The filling of the reservoirs and attachment of the spacer to the substrate may be done in any suitable order. The attachment of the spacer layer to the first conductive film substrate may be done by any suitable method. Adhesive may be used for convenience. Once the reservoirs are filled with display medium and the spacer is attached to the first conductive film substrate, the second, or top, conductive film substrate, which must be transparent, is attached to seal the reservoirs. Again, this attachment of the second conductive film substrate may also be done by any suitable means, including gluing with an adhesive. Additional layers may be included between the spacer layer and conductive substrates as desired, without restriction.

Figure 3:
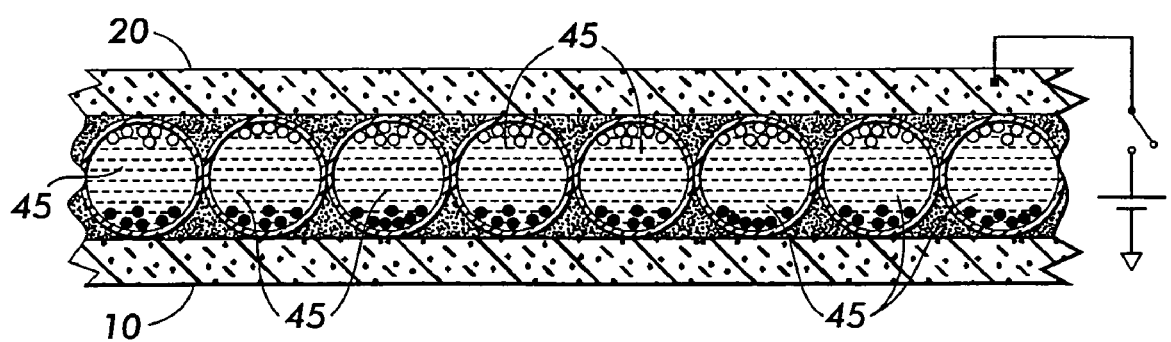
FIG. 3 illustrates a side view of an electrophoretic display device in accordance with another embodiment in which the display mediums are encapsulated in individual microcapsules.

A second embodiment of a suitable electrophoretic display device is illustrated in FIG. 3. As illustrated in FIG. 3, the electrophoretic display device again comprises two conductive film substrates 10 and 20 disposed oppositely of each other. However, in this embodiment, the electrophoretic layer between the substrates is comprised of a multiplicity of microcapsules (each labeled 45) that encapsulate the electrophoretic display medium therein. The microcapsules are held in a suitable matrix material. A similar electrophoretic display device utilizing microcapsules is described in U.S. Pat. No. 6,017,584, incorporated herein by reference in its entirety. Preferably, the microcapsules are made to have a size (diameter) within the range discussed above for reservoir width/diameter.

In this embodiment, the microcapsules are first prepared. The microcapsules are then glued onto one of the conductive film substrates of the device.

For making the microcapsules of this embodiment, any suitable method of encapsulation may be used. The process of encapsulation may include conventional coacervation, interfacial polymerization, in-situ polymerization, electrolytic dispersion and cooling, or spray-drying processes. The microcapsules can also be prepared by a process utilizing isocyanate-polyol, urea-formaldehyde-resorcinol, melamine-formaldehyde resins, or hydroxypropyl cellulose wall-forming materials.

Preferred microcapsules can have a multi-layer wall around the core solid and/or liquid encapsulants. These can be made, for example, by first forming a thin wall by an interfacial polymerization reaction, and subsequently forming a second, thicker wall by an in-situ polymerization reaction or by a coacervation process. The first wall of the microcapsule may be typically comprised of polyurea, polyurethane, polyamide, polyester, epoxy-amine condensates and silicones. The second wall of the microcapsule may be typically comprised of condensates of melamine-formaldehyde, urea-formaldehyde, resorcinol-formaldehyde, phenol-formaldehyde, gelatin-formaldehyde, or interpolymer complexes of two oppositely charged polymers such as gelatin/gum arabic and poly(styrene sulfonic acid)/gelatin.

A semi-continuous miniemulsion polymerization process may also be used to encapsulate the electrophoretic display medium, for example as described in U.S. Pat. No. 6,529,313, incorporated herein by reference in its entirety.

A benefit of encapsulating the electrophoretic display medium in accordance with the above methods is that the microcapsules can be made to be spherical as shown in FIG. 3 or other than spherical through control of the process. Different shapes may permit better packing density of the microcapsules and better display quality.

Once generated, the microcapsules are then adhered to one of the conductive film substrates of the device, for example using any suitable binder such as an adhesive or polymer matrix material that is either mixed with the microcapsules prior to coating the microcapsules on the substrate, coated onto the substrate before placement of the microcapsules thereon, or coated upon the microcapsules after placement upon the substrate. The microcapsules are preferably arranged in abutting, side-by-side relationship and preferably in a monolayer (i.e., the microcapsules preferably are not stacked) between the two conductive film substrates. However, more than one layer of microcapsules may be used without limitation.

Next, the electrophoretic display mediums for use in the electrophoretic display device will be described.

The electrophoretic display medium is comprised of at least one set of colored particles dispersed in a medium in which the particles may move when the medium is heated to an elevated temperature, for example at least about 35° C., but are substantially fixed in the medium when the medium is at ambient temperature. The medium preferably is comprised of at least a liquid and a thermally reversible gelling agent having a melting point temperature of at least about 35° C.

In one embodiment, the electrophoretic display medium comprises one set of particles dispersed in a colored medium comprised of a liquid and a thermally reversible gelling agent, the particles exhibiting different, contrasting color to the color of the medium. The colored medium may preferably comprise a liquid system of two immiscible liquids having different densities such that the immiscible liquid having a density less than that of the other immiscible liquid rests on top of the other immiscible liquid, and the set of particles preferably has a density in between the densities of the two immiscible liquids such that the particles rest at an interface between the two immiscible liquids, as explained in more detail below.

The liquid system may be colored by any suitable colorants therein, for example through the inclusion of any suitable dyes and/or dispersible pigments therein.

In a second embodiment, the electrophoretic display medium comprises two sets of particles dispersed in a medium comprised of a transparent liquid system (although it may be useful to also color/tint the liquid system) and a thermally reversible gelling agent, the two sets of particles exhibiting different, preferably contrasting, color and different charging or magnetic properties from each other.

The liquid materials of the display medium liquid system may be comprised of a single fluid, or may be comprised of a mixture of two or more fluids, which mixture of fluids may either be miscible with each other or immiscible as described below. The liquid system preferably contains from about 50 to about 95% by weight of the liquid system and about 5 to about 50% by weight of the sets of particles, the separate sets of particles preferably being each contained in the display medium in approximately equal amounts. The liquid of the liquid system and the sets of particles therein preferably have densities that are matched, i.e., the densities of these materials are within about 10% of each other.

The liquid system of the display medium may be comprised of any suitable liquid, for example including liquids known in the art for display mediums. Preferably, the liquid is clear or transparent and does not itself exhibit any color, although again such is not prohibited as discussed above. The choice of liquid may be based on concerns of chemical inertness, density matching to the particles to be suspended therein and/or chemical compatibility with the particles. The viscosity of the fluid should be relatively low to permit the particles to move therein, for example under the influence of an electrical field, when the medium is heated to an elevated temperature. The fluid is preferably dielectric and substantially free of ions. The fluid preferably has minimum solvent action on the colored particles and microcapsule/reservoir walls, and a specific gravity about equal to the colored particles.

As the liquid system, mention may be made of hydrophobic organic solvents, hydrophobic organic or polymer liquids, or mixtures thereof. Organic solvents, such as halogenated organic solvents, saturated linear or branched hydrocarbons, silicone oils, and low molecular weight halogen-containing polymers are a few suitable types of liquids. Useful organic solvents and polymers include, but are not limited to, epoxides, such as, for example, decane epoxide and dodecane epoxide; vinyl ethers, such as, for example, cyclohexyl vinyl ether; and aromatic hydrocarbons, such as, for example, toluene and naphthalene. Useful halogenated organic solvents include, but are not limited to, tetrafluorodibromoethylene, tetrachloroethylene, trifluorochloroethylene, 1,2,4-trichlorobenzene, and carbon tetrachloride. These materials have high densities. Useful hydrocarbons include, but are not limited to, decane, dodecane, tetradecane, xylene, toluene, hexane, cyclohexane, benzene, the aliphatic hydrocarbons in the ISOPAR® series (Exxon), NORPAR® (a series of normal paraffinic liquids from Exxon), SHELL-SOL® (Shell), and SOL-TROL® (Shell), naphtha, and other petroleum solvents. These materials usually have low densities. Useful examples of silicone oils include, but are not limited to, octamethyl cyclosiloxane and higher molecular weight cyclic siloxanes, poly(methyl phenyl siloxane), hexamethyldisiloxane and polydimethylsiloxane. These materials usually have low densities. Useful low molecular weight halogen-containing polymers include, but are not limited to, poly(chlorotrifluoroethylene) polymer or KRYTOX® from Dupont.

In an additional embodiment, the liquid system of the display medium may be comprised of two immiscible liquids. This two-layer liquid system may be achieved using two fluids with differing densities and that are immiscible with each other. 3M's fluoroether and Exxon's ISOPAR® M are a suitable combination. Fluoroether, being denser, rests on the bottom, while ISOPAR®, being less dense, rests on top. The particles of the display medium should have a density that is in between the densities of the two immiscible liquids so that they rest at the interface between the two layers to create the desired suspension.

There are several advantages of using two immiscible liquids. First, the rest position of the particles is at the interface of the two immiscible liquids (which is most preferably near the middle portion of the reservoir or microcapsule) rather than at the bottom of the reservoir or microcapsule in which the display liquid is contained. This minimizes the adhesion between the particles and the reservoir or microcapsule (e.g., the encapsulation shell). Second, switching time is made faster since the particles only need to travel a portion of the distance of the reservoir or microcapsule, e.g., half of the distance. Third, the particles resting at the interface break loose easily compared to particles resting at the bottom. This can increase the particle stability and the product life.

The display medium also includes at least one thermally reversible gelling agent. The gelling agent acts to fix the image formed therein at ambient temperatures. To do this, the gelling agent forms a gel state at such temperatures, thereby forming a gel, e.g., semi-solid to solid, state. The image aspects of the display medium, i.e., the coloring components including the particles and/or liquid system, are temporarily fixed within the gel formed by the gelling agent. The gel state is preferably formed and maintained at temperatures of up to at least about 25° C., preferably of up to at least about 40° C. If the display device may be expected to be subjected to higher temperatures and still be required to maintain the image formed therein, a gelling agent may be selected for use that has a higher gel point temperature. For example, a gelling agent may be selected that maintains the gel state at higher temperatures, for example of up to about 45° C., about 50° C., or even higher.

The gelling agent is thermally reversible in that upon heating to and above the melting point, the gelling agent melts/converts to a more fluid/liquid state, and such conversion between the gel and non-gel states may be repeated endlessly. Upon heating to about the melting point of the gelling agent or above, the gelling agent melts/converts to the non-gel state, which state has a significantly lowered viscosity compared to the gel state. In this state, the image components of the display medium may freely move within the display medium. Thus, to form the image in the display device, the device is heated to an elevated temperature at which the gelling agent has a reduced viscosity permitting the image, i.e., coloring, aspects of the display medium to move within the medium. For example, the display medium is preferably heated to a temperature of at least about the melting point of the gelling agent. In preferred embodiments, the image may be formed in the display medium at elevated temperatures of at least about 35° C., preferably about 35° C. to about 100° C., more preferably from about 45° C. to about 70° C., although temperatures outside of these ranges may also be suitably used.

As the thermally reversible gelling agent, any gelling agents having melting points and gel points within the aforementioned ranges, when used alone or in combination, may be used without limitation. As example gelling agents, mention may be made of gelling agents for hydrocarbon organic solvents and hydrophobic organic or polymer liquids. The gelling agents are preferably able to dissolve in hydrophobic organic or polymer liquids with warming and are able to form a substantially transparent gel upon cooling to a gel state. The melting point of the gelling agent depends on the polarity of the solvent and the concentration of the gelling agent. In preferred embodiments, the melting point of the gelling agent is in a range of about 45° C. to about 70° C., with a gelling point of about 20° C. to about 40° C.

The gelling agents that may be used are not limited. Any gelling agents that have the aforementioned properties may be suitably used. Thus, a wide array of gelling agents may be used herein. For example, gelling agents such as those described in, but not limited to, EP 0207787; EP 0338738; U.S. Pat. No. 6,872,243; U.S. Pat. No. 5,132,355; U.S. Pat. No. 3,960,514; U.S. Pat. No. 5,417,287; U.S. Pat. No. 5,514,645; U.S. Patent Publication No. 2004-0065227 A1; "Method of Gelling Hydrocarbons and Fracturing Subterranean," McCabe et al. Publications; "New Carbohydrate-Based Gelling Agents for Organic Solvents," Tent et al., Cosmet. Toiletries (1977), 92(9), 39-40; and "Novel Family of Gelators of Organic Fluids and the Structure of Their Gels," Yih-chyuan Lin, Bechara Kachar, and Richard G. Weiss, J. Am. Chem. Soc. 1989, 111, 5542-5551; Johal, M. S. et al., Chem. Mater. S, 1999, 11, 1962; all of which are hereby incorporated by reference. As evident from the foregoing, e.g., U.S. Patent Publication No. 2004-0065227 (incorporated herein by reference with respect to gelling agents), any gelling agents such as typically employed in phase change ink compositions may also be used.

Non-limiting examples of gelling agents include trans-4-t-butyl-1-phenyl-cyclohexanol, 4-t-butyl-1-fluorinated aryl-cyclohexanol derivatives, and supramolecular ribbons derived from barbituric acid and melamine derivatives.

The gelling agent may be included in the display-medium in any suitable amount. In a preferred embodiment, the gelling agent comprises from about 0.1% to about 10% by weight of the display medium, preferably from about 0.1% to about 5% by weight of the display medium, most preferably from about 0.5% to about 3% by weight of the display medium.

The display medium may also contain optional additives such as surface modifiers to modify the surface energy or charge of the particles. Charge control agents, charge directors, dispersants, and surfactants can also be added to the display medium to improve the performance of the system, as desired or necessary.

The particle sets dispersed in the medium will next be described.

Where two differently colored particle sets are employed in the display medium, the particles of each of the sets are each of a different color, for example most typically black and white. The sets of particles should preferably be of contrasting colors, e.g., one set should be light in color such as white while the other set of particles should be dark in color, for example black. Also, each set of colored particles possesses at least one different electrophoretic property. By this is meant that the different sets of colored particles must possess a different property that enables the different particles to be separately manipulated, for example by an electrical field, magnetic field, etc., such that the different sets of particles respond differently to the manipulation and thus the reservoirs or microcapsules containing the display liquid of the display device can exhibit the color of the desired set of colored particles.

Figure 2:
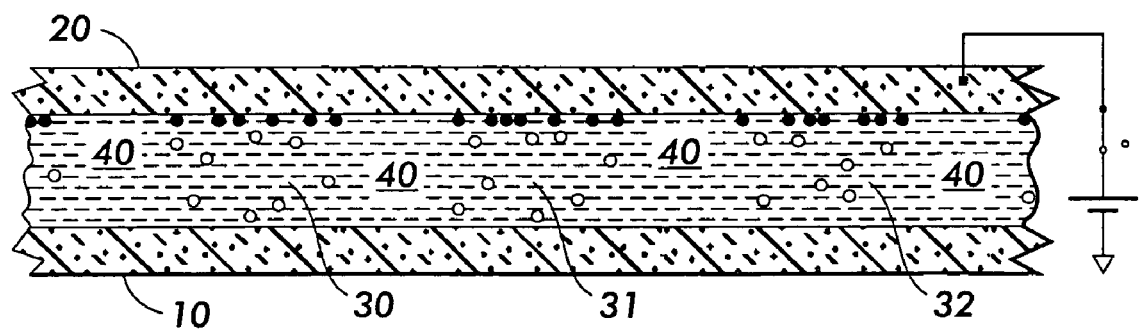
FIG. 2 illustrates the same electrophoretic display device in an on position.

For example, the sets of colored particles preferably possess different charge properties, e.g., one set of colored particles is charged while a second set of colored particles is either not charged or is charged oppositely of the first set of colored particles. FIGS. 1 and 2 illustrate an embodiment where a first set of white particles is not charged while a second set of black particles is charged. Since the white particles are not charged in the medium, these particles will not move under application of an electric medium when the medium is at an elevated temperature (at which the particles are otherwise mobile within the medium), whereas the colored particles are made to move under the field. FIG. 1 shows that when no electrical field is applied and the medium allows for mobility, the colored (black) particles are scattered inside the reservoirs and therefore the color seen from the top surface is white. FIG. 2 shows that when the electrical field is applied and the medium allows for mobility, the colored (black) particles move to the top surface, and thus the black color image appears. This image may be fixed in the display device through use of the gel state of the gelling agent as discussed above.

In operating the electrophoretic display device, an electric field, which may either be AC or DC, but is preferably AC, is applied to the reservoirs or microcapsules of the device, when the device is at an elevated temperature such that the coloring aspects of the medium are mobile, in order to move the desired set of particles in the reservoirs or microcapsules to be displayed. The particles are preferably developed under an electrical field of from about 0.1 to about 1 volt per micron gap. For example, as described above with respect to FIGS. 1 and 2 (where a first set of white particles are not charged and a second set of black particles are charged), since white particles are not charged in the liquid system, they will not move under electrical field, whereas the colored particles are moving under the field. FIG. 1 shows that when no electrical field is applied, i.e., the field is in the off position, the colored (black) particles are scattered inside the reservoirs and therefore the color seen from the top surface is white. FIG. 2 shows that when the electrical field is applied, i.e., the on position, the colored (black) particles move to the top surface, and thus the color image appears. If the sets of particles have opposite charges, the off position could mean application of a negative electric field, and thus display of the white particles, while the on position could be application of a positive electrical field, and thus display of the black particles. The particles in these embodiments are moved within the liquid system by way of electrostatic force generated due to the electric field applied or not applied.

In the display device, each of the individual reservoirs or microcapsules is preferably individually addressable, although such is not necessary. Thus, the size of the electrodes can be the same as the size of the containers, enabling individual control of each container. In this manner, the electric field of each reservoir can be individually controlled. Also, the size of the electrodes can be different from the size of the containers, thereby enabling more than one container to be controlled by a single electrode where the electrode is larger than the container or enabling only a portion of the container to be controlled (turned on and off) by an electrode where the electrode is smaller than the size of a container. That is, the pattern of the electrodes does not need to line up with the reservoirs. The foregoing can be done by, for example, appropriate patterning of the conductive path on the bottom conductive film substrate. An example of the patterning of electrodes can be found in, for example, U.S. Pat. No. 3,668,106.

As the particles of the particle sets, any particles capable of being colored and charged may be used. Preferably, toner particles made by any suitable method are used as at least one of the colors of the colored particle sets. Charged carrier particles may also be used as one of the sets of colored particles. The particles may be hollow or solid. While the particles may have any suitable size, the particles preferably have a small size of, for example, from about 1 to about 35 microns, more preferably from about 1 to about 15 microns. The particles may be modified with charge control agents to set the charging properties of the particles to a desired extent. One or more sets of the particles of the display medium may also be encapsulated in a metal oxide shell, preferably a titania shell or silica shell that possesses electrophoretic migration capabilities under application of an external field.

In a still further embodiment, any of the above-described particle materials that are non-magnetic in nature may be used in conjunction with magnetic particles, e.g., magnetic colored or toner particles. The idea is to prepare a liquid containing two types of colored particles (one magnetic and one non-magnetic) with opposite charge and visual contrast color. Most preferably, the magnetic particles are dark-colored, e.g., black.

Figure 4:
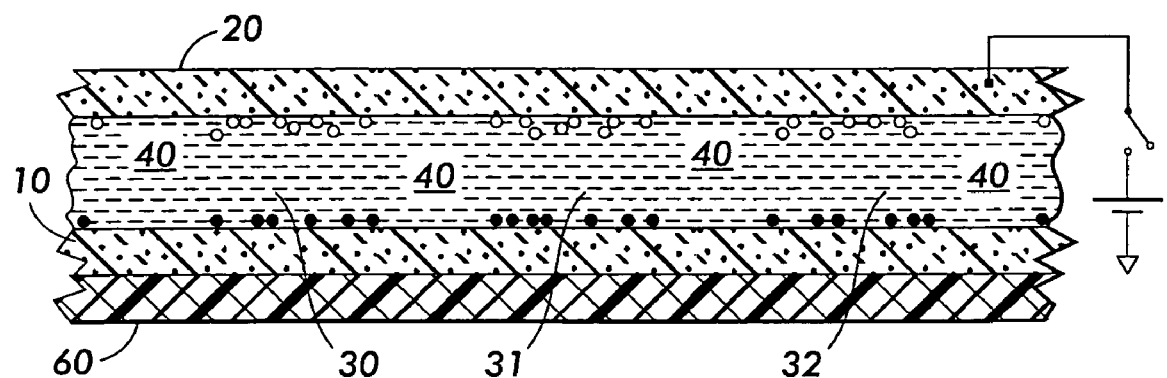
Figure 5:
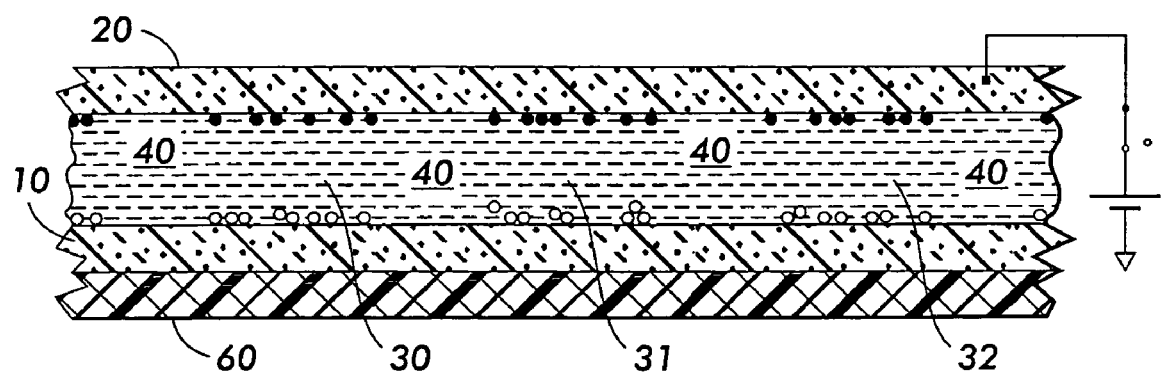
FIG. 5 illustrates the same electrophoretic display device in an on position.

FIG. 4 (off position) and FIG. 5 (on position) illustrate a side view of an example electrophoretic display device in which the display mediums include magnetic force attracting magnetic particles. As shown, the device is similar to the device of FIGS. 1 and 2, but includes an additional layer of a magnetic material, for example a magnetic plastic film 60, under the display to generate a magnetic force.

Application of a magnetic force can help attract the black magnetic particles to the bottom surface when the electric field it is at off position and the medium allows for mobility (e.g., at elevated temperatures), which provides better hiding powder for the white particles of the display medium. In this embodiment, the switching may involve not only application of the electric field, but also application of a magnetic force that works in conjunction with the electric field in moving the desired set of particles in the desired direction in the reservoir or microcapsule when the medium allows for such mobility. The magnetic force applied to the black magnetic particles may range from, for example, about 50 Gauss to about 600 Gauss. The magnetic force may be applied, for example, using a thin magnetic sheet with a thickness of from about 0.1 mm to about 4 mm and is composed of magnetic powder such as ferrite particles and thermoplastic resin such as silicon rubber. As the electrical field exceeds the magnetic force, the black magnetic particles move with the electrical field. As the electrical field is below the magnetic force, the black magnetic particles move back. Once formed, the image may be fixed in the display device through use of the gel state of the gelling agent as discussed above.

In embodiments, the image is created by passing the display device, preferably in the form of a thin sheet, through an image-developing unit in which the temperature is above the melting point of the gelling agent. The developing unit applies the necessary fields to develop the desired image in the display device. The display device may then be cooled to a temperature at which the gel state forms, for example ambient temperature, thereby fixing the image in the display device. The image remains stable within the display device until the gel is again melted.

The following Example illustrates preparation of an example display medium and microcapsule containing the display medium.

To a 500 ml Morton reaction flask, 10 grams of 300 bloom from swine and 200 ml cold distilled water were added and the mixture was stirred in a 60° C. water bath for about one half hour. 20 grams of 1 wt % sodium polyphosphate was added and the pH of the mixture was adjusted to about 4.0-4.5 with dilute acetic acid to induce formation of a coacervate. After the coacervate was formed, a mixture of blue and white electrophoretic particles in ISOPAR M (about 5 wt %) with a 1 wt % gelling agent (trans-t-butyl-1-phenyl-cyclohexanol) was added. The mixture was stirred at about 30° C. to 60° C. for about 4 hours, and the microcapsules having the display medium encapsulated therein were formed. The microcapsule walls were crosslinked by reacting with glutaric dialdehyde and urea-formaldehyde. The microcapsules were then dried by freeze drying.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method of forming an image in an electrophoretic display device comprising an electrophoretic display layer located between two conductive film substrates, at least one of which is transparent, wherein the electrophoretic display layer includes therein a multiplicity of individual units that contain a display medium, wherein the display medium comprises a liquid system, at least one thermally reversible gelling agent, and at least one set of particles exhibiting a color, the method comprising heating the display device to a temperature of about or above a melting point of the at least one thermally reversible gelling agent, subsequently forming an image in the display device by selective application of an appropriate field to selected ones of the multiplicity of individual units to move the at least one set of particles within the heated display medium, and subsequently cooling the display device to a temperature of about or below a gel point of the at least one thermally reversible gelling agent to fix the image in a gel state.

2. The method according to claim 1, wherein the at least one gelling agent has a melting point of from about 45° C. to about 70° C. and a gel point of from about 20° C. to about 40° C.

3. The method according to claim 1, wherein the field applied is an electric field, a magnetic field, or a combination thereof.

4. The method according to claim 1, wherein the melting point of the at least one thermally reversible gelling agent is from about 35° C. to about 100° C.

5. The method according to claim 1, wherein the liquid system comprises a hydrophobic organic solvent, hydrophobic organic or polymer liquid, or mixtures thereof.

6. The method according to claim 1, wherein the at least one gelling agent is trans-4-t-butyl-1-phenyl-cyclohexanol, 4-t-butyl-1-fluorinated arylcyclohexanol derivatives, or a supramolecular ribbon derived from barbituric acid and melamine derivatives.

7. The method according to claim 1, wherein the gelling agent comprises from about 0.1% to about 10% by weight of the display medium.

8. The method according to claim 1, wherein the gelling agent comprises from about 0.5% to about 3% by weight of the display medium.

9. The method according to claim 1, wherein the at least one set of particles comprises at least two sets of particles, the at least two sets of particles exhibiting different, contrasting color and different charging or magnetic properties from each other.

10. The method according to claim 1, wherein the liquid system is transparent.

11. The method according to claim 1, wherein the liquid system comprises two immiscible liquids having different densities such that a first immiscible liquid having a density less than that of a second immiscible liquid rests on top of the first immiscible liquid, and wherein the at least one set of particles have a density in between the densities of the two immiscible liquids such that the particles rest at an interface between the two immiscible liquids.

12. The method according to claim 1, wherein the at least one set of particles is dispersed in a colored liquid system, the at least one set of particles exhibiting a different color from the color of the liquid system.

13. The method according to claim 1, wherein the display medium is encapsulated within microcapsules.

* * * * *